3,292,696
WATER FLOODING
Burton B. Sandiford, Placentia, Calif., assignor to Union Oil Company of California, Los Angeles, Calif., a corporation of California
No Drawing. Filed May 31, 1960, Ser. No. 32,550
2 Claims. (Cl. 166—9)

This invention relates to the recovery of petroleum from subterranean oil wells and, in particular, relates to water flooding operations wherein the oil is displaced from the reservoir by water.

Water flooding operations are well known in the art and, in general, comprise a method wherein water is injected into a reservoir through one or more wells so as to displace the oil from the sands and drive it towards production wells from where it is withdrawn. Various patterns of injection and withdrawal wells are employed depending on the nature of the reservoir and the position of the existing wells.

In these water flooding operations, the path or travel of the injected water through the reservoir depends largely on its mobility, i.e., the quotient of the reservoir's permeability to the water divided by the water viscosity. When this mobility becomes large relative to the mobility of the reservoir oil, the water tends to channel or finger through the reservoir towards the production well, bypassing a substantial portion of the oil which is never recovered. This tendency of the water to finger or channel through the reservoir can be retarded by either decreasing the permeability of the formation to the water or by increasing the viscosity of the water. It is this latter technique, i.e., increasing the viscosity of the water, which concerns this invention.

It is an object of this invention to provide a method for increasing the viscosity of water to render it suitable for water flooding operations in subterranean oil wells.

It is an object of this invention to provide a method for obtaining a stable viscosity additive for flood waters which is not adsorbed by the reservoir sand and which does not plug the formation.

I have found that the aforementioned objectives are achieved by the addition of between about 0.02 and 10 percent by weight of hydroxyethyl cellulose to the flood waters. The use of hydroxyethyl cellulose in these concentrations causes an increase in viscosity of the water from 1.0 centipoise to between about 2.0 to 2000 centipoises at 75° F. In addition to its viscous nature, hydroxyethyl cellulose in aqueous solutions exhibits several other characteristics which make the material valuable in reservoir flood waters. Among these are:

Hydroxyethyl cellulose solutions are inert to sands and are not adsorbed thereon, Hydroxyethyl cellulose solutions do not cause plugging of sands, Hydroxyethyl cellulose solutions are relatively stable in oil field brines containing metal and alkali salts, reducing agents and even bacteria, Hydroxyethyl cellulose solutions are stable under turbulence and agitation, and Hydroxyethyl cellulose solutions exhibit a beneficial viscosity-shear relationship, having high viscosities under low shear rates such as are encountered at the oil-water interface in a flooding process, and having lower viscosities under high shear rates such as are encountered at the injection sites.

Hydroxyethyl cellulose is prepared from shredded wood pulp which has been soaked in 30 percent aqueous sodium hydroxide for about 20 hours. The resultant alkali cellulose is reacted with either ethylene oxide or ethylene chlorohydrin until a sufficient number of ethylene groups per glucose unit have been combined. The water soluble form of hydroxyethyl cellulose, which is employed in my invention, has a substitution (hydroxyethyl groups per glucose unit) greater than about 0.5, and preferably about 1.0 to 2.0. This is in contrast to the alkali soluble form of hydroxyethyl cellulose which has a substitution less than about 0.3. Generally, about 4 to 5 hours are required at about 40° C. for complete reaction of the alkali cellulose with the ethylene compound to produce a water soluble hydroxyethyl cellulose. The product is available commercially as either a solid fibrous material or in the form of aqueous solutions having up to about 10 percent hydroxyethyl cellulose and viscosity ranges from about 10 to 1200 centipoises. A very high molecular weight compound suitable for use in my invention is marketed by The Hercules Powder Company as Natrosol 250. Other suitable products are marketed as under the name Cellosize, products of the Carbide and Carbon Chemical Company.

In accordance with my invention, a sufficient amount of water soluble hydroxyethyl cellulose is added to the flood waters to substantially reduce the mobility of the water and retard its tendency to channel through the reservoir. Even slight amounts of hydroxyethyl cellulose are effective for this purpose since the water viscosity is increased by the presence of the additive, however it is preferred that a sufficient amount be added to attain a water viscosity of at least about 1 centipoise or greater at the reservoir temperature. When possible, I prefer to add hydroxyethyl cellulose in an amount sufficient to achieve a water viscosity between about 10 and 1000 centipoises. The exact amount necessary to provide these viscosities dependent on the reservoir temperature, the molecular weight and substitution of the hydroxyethyl cellulose, as well as the nature and amount of impurities and salts in the flood waters. Usually, however, this amount is between about 0.02 and 1.0 weight percent of the solution.

In accordance with conventional practice, various other agents can be added to the flood waters, e.g., between about 0.05 and 5.0 weight percent of a surface active or wetting agent such as quaternary ammonium compounds, sorbitan, alkyl pyridinium salts, etc., can be employed to obtain a more efficient recovery of the reservoir oil in the area swept by the floodwaters; bactericides such as aldehydes, chlorinated phenols, etc., can be added to prevent bacteria action; corrosion inhibitors; tracers, etc., can likewise be added when desired.

In carrying out my invention, an otherwise conventional water flooding operation is conducted and hydroxyethyl cellulose is added to the flood waters in the aforementioned concentrations. As with conventional practice, the interval to be flooded can be isolated by packers placed in the injection and production wells and thereafter the flood waters are pumped into the interval through one or more injection wells with conventional pumping equipment available at the well sites. The flood waters can be any available water, generally oil field brine, to which has been added the desired amount of hydroxyethyl cellulose. As with conventional practice, it may be desirable to limit the addition of hydroxyethyl cellulose to the flood front adjacent the reservoir oil and employ ordinary brine or water to drive this band or front of viscous water. This is readily accomplished by adding the hydroxyethyl cellulose to the flood water initially introduced into the well until about 0.001 to about 0.3 reservoir pore volumes of water have been injected and thereafter discontinuing the addition of hydroxyethyl cellulose. To avoid any sharp demarcations in viscosity which could adversely affect the relative mobilities and cause channelling, the addition of hydroxyethyl cellulose can be lessened gradually through a series of incremental decreases rather than discontinuing the addition abruptly. In this manner, water present in the flooded interval is always adjacent water of approximately equal viscosity and the tendency of the less viscous water to channel into through more viscous water is substantially eliminated. As previously mentioned, the water which is injected into the reservoir displaces oil from the sands and forces this oil away from the water injection zone. At suitable distances from the injection well, one or more other wells which also communicate with the flooded interval are opened to production and the displaced oil is withdrawn through these wells.

To demonstrate the improved results obtained by the use of aqueous hydroxyethyl cellulose solutions in accordance with the invention, the following tests were performed.

*Example I*

A sandstone core composed of Nevada 70 sand, one inch in diameter and about five inches long, was mounted in a core holder equipped with pressure fittings on its opposite faces to permit the passage of fluids through the length of the core. The core was saturated with a synthetic oil field brine which was displaced by forcing a hydrocarbon oil having a viscosity of about 206 centipoises at room temperature into the core until brine was no longer displaced. The volume of oil introduced at this point was recorded as $V_0$. The core thus prepared simulates the saturation condition which prevailed in the original formation and is referred to as a "restored core."

A water flooding operation was simulated in this restored core by injecting water into one end of the core and recovering displaced oil from the opposite end until water was detected in the displaced oil. The volume of oil recovered at this point, called the breakthrough point, was recorded as $V_1$. The flooding operation was continued until the oil was no longer detected in the effluent from the core. The total volume of oil thus recovered was recorded as $V_2$. The efficiencies of the operation are specified as follows:

Breakthrough efficiency $= E_B$ $$E_B = \frac{V_1}{V_0} \times 100$$

Overall efficiency $= E_0$ $$E_0 = \frac{V_2}{V_0} \times 100$$

The core was again restored and the volume of oil restored was recorded. The flooding operation was repeated with water containing viscous additives and the breakthrough and overall oil recoveries were recorded. From these recoveries, breakthrough and overall efficiencies were determined by the aforementioned equations, and designated as $E_B'$ and $E_0'$ respectively. The data obtained are set forth in the following Table:

From the foregoing it can be seen that the prior art suggested material, carboxymethyl cellulose, very severely plugs the sandstone core preventing satisfactory oil recovery. The use of hydroxyethyl cellulose under comparable conditions achieved very satisfactory oil recoveries in excess of that obtained by use of water alone.

*Example II*

To demonstrate the inertness of hydroxyethyl cellulose to oil sands, a core of an oil reservoir sand and a core of a dry outcrop sand were tested in core holders similar to that previously described. An aqueous solution containing 0.3 percent by weight of hydroxyethyl cellulose with a viscosity of 14.0 centipoises at 75° F. was forced through the core and collected as it exited from the opposite end of each core. The viscosity of the effluent thus collected from both cores was found to be 14.0 centipoises, indicating no change from its contact with the sand. In contrast, many of the naturally occurring resins and gums suggested by the prior art, e.g., locust bean gum, gum karaya, guar gum, agar, Irish moss, etc., are adsorbed on the sand surface and the viscosities of their aqueous solutions are decreased substantially by contact with sand.

*Example III*

To demonstrate the stability of hydroxyethyl cellulose, two test procedures were conducted. The first test consisted in placing a solution of hydroxyethyl cellulose in a mechanical shaking device. The viscosity of the solution before and after about 18 hours of agitation in the device was 11.5 centipoises. In the second test a solution of hydroxyethyl cellulose in oil field brine was prepared. This oil field brine contained reducing agents and bacteria which cause the decomposition and loss in viscosity of prior art viscosity agents upon even short storage periods. The viscosity of the hydroxyethyl cellulose solution, however, remained constant at 11.0 centipoises throughout a 7-day storage test. From the aforedescribed tests, it is apparent that aqueous solutions of hydroxyethyl cellulose are very well suited to the water flooding of subterranean reservoirs because of their viscous nature, stability and inertness to reservoir sands and to typical oil field brines commonly used as flood waters in subterranean reservoirs.

*Example IV*

To demonstrate the viscosity-shear characteristics of hydroxyethyl cellulose solutions, the viscosities of a 0.3 weight percent solution thereof was determined at various shear rates in a Stromer viscosimeter. This viscosimeter is a standard test device and is described on page 22 of "Industrial Chemistry of Colloidal and Amorphous Materials" by Lewis, Squires and Broughton (1942). Briefly, the device comprises a suspended weight which is permitted to fall and transmit a torque to a cylinder immersed within the liquid. The angular velocity (r.p.m.) of the cylinder is observed and is a function of the liquid's viscosity and the magnitude of the suspended weight. By varying the weight, the liquid's viscosity at different angular velocities or shear rates can be determined. The following results were obtained:

| Test No. | Description | $E_B$ | $E_0$ | $E_B'$ | $E_0'$ | $E_B'/E_B$ | $E_0'/E_0$ | Remarks |
|---|---|---|---|---|---|---|---|---|
| 1 | Water flood | 24.8 | 53.5 | | | | | |
| 2 | 0.3% hydroxyethyl cellulose in water viscosity=11.5 cps. | | | 38.0 | 69.0 | 1.53 | 1.29 | |
| 3 | 1% carboxymethyl cellulose in water viscosity=30 cps. | | | 0.5 | | 0.22 | | Core completely plugged by the solution before the test was completed. |

Shear rate (revolutions/minute): Viscosity (centipoises)

| Shear rate (revolutions/minute) | Viscosity (centipoises) |
|---|---|
| 17 | 22 |
| 23 | 22 |
| 40 | 22 |
| 70 | 22 |
| 132 | 22 |
| 250 | 22 |
| 477 | 14.2 |
| 600 | 12.8 |
| 858 | 9.6 |
| 1500 | 5.5 |

These data show that at the low shear rates, i.e., low r.p.m. on the viscosimeter, aqueous solutions of hydroxyethyl cellulose are at their maximum viscosity. Such low shear rates are encountered at the oil-water interface in a flooding operation where the injected water is spread out over a very large flow area and where maximum viscosity is desired. At high shear rates; high r.p.m. on the viscosimeter; hydroxyethyl cellulose solutions exhibit their minimum viscosity. Such high shear rates are encountered at the injection sites where a large volume of flood waters must be injected through a relatively small well bore. A lowered viscosity under these conditions greatly reduces the power and equipment needed for injection.

From the foregoing, it can be seen that hydroxyethyl cellulose is a very useful material to increase the viscosity of subterranean flood waters. It causes substantial increases in flood water viscosity at low concentrations, it is relatively inert to oil reservoir sands, it is relatively stable and it exhibits high viscosities at low shear rates and lower viscosities at high shears rates thereby facilitating its injection into the reservoir.

Other modes of applying the principle of my invention may be employed instead of those explained, change being made as regards the methods or materials employed provided the step or steps stated by any of the following claims, or the equivalent, be employed.

I claim:

1. In the method of recovering oil from a subterranean oil-bearing reservoir wherein relatively non-viscous aqueous liquid is injected into said reservoir and, at a spaced distance therefrom, displaced oil is withdrawn from said reservoir to the earth's surface, the improvement comprising: initially injecting a first aqueous solution of hydroxyethyl cellulose having a viscosity between about 10 and 1000 centipoises at 75° F., continuing said injection until between about 0.001 to 0.03 times the pore volume of said reservoir to be flooded is injected and then injecting a second solution of hydroxyethyl cellulose into said reservoir, said second solution having a viscosity intermediate the viscosities of said first solution and said relatively non-viscous aqueous liquid and thereafter injecting into said reservoir said relatively non-viscous aqueous lquid.

2. The method of claim 1 wherein a series of solutions of hydroxyethyl cellulose having successfully decreasing viscosities are injected after the injection of said first solution but prior to the injection of said relatively non-viscous aqueous liquid.

References Cited by the Examiner

UNITED STATES PATENTS

| 2,341,500 | 2/1944 | Detling | 252—8.55 |
| 2,570,947 | 10/1951 | Himel et al. | 252—8.5 |
| 2,731,414 | 1/1956 | Binder et al. | 252—8.55 |
| 2,778,427 | 1/1957 | Cardwell et al. | 252—8.55 |
| 2,827,964 | 3/1958 | Sundiford et al. | 252—8.55 |
| 2,961,400 | 11/1960 | Park | 252—8.55 |

OTHER REFERENCES

Zimmerman et al.: Handbook of Material Trade Names, 1953 edition, published by Industrial Research Service, Dover, New Hampshire, page 120.

SAMUEL H. BLECH, *Primary Examiner.*

JOSEPH R. LIBERMAN, JULIUS GREENWALD,
*Examiners.*

H. B. GUYNN, *Assistant Examiner.*